United States Patent
Godo et al.

(10) Patent No.: US 12,090,860 B2
(45) Date of Patent: Sep. 17, 2024

(54) METHOD OF CONTROLLING A VEHICLE HAVING A ONE-PEDAL DRIVING SYSTEM

(71) Applicant: ArvinMeritor Technology, LLC, Troy, MI (US)

(72) Inventors: Edvin Godo, Troy, MI (US); Banuchandar Muthukumar, Troy, MI (US); Frank Falcone, Troy, MI (US); Ameya Jathar, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 298 days.

(21) Appl. No.: 17/591,177

(22) Filed: Feb. 2, 2022

(65) Prior Publication Data

US 2023/0241981 A1    Aug. 3, 2023

(51) Int. Cl.
*B60L 15/20* (2006.01)
*B60L 7/18* (2006.01)
*B60W 50/029* (2012.01)

(52) U.S. Cl.
CPC ............. *B60L 15/20* (2013.01); *B60L 7/18* (2013.01); *B60W 50/029* (2013.01); *B60L 2240/12* (2013.01); *B60L 2240/423* (2013.01); *B60L 2250/26* (2013.01); *B60L 2260/24* (2013.01); *B60L 2260/26* (2013.01); *B60W 2050/0292* (2013.01); *B60W 2710/083* (2013.01)

(58) Field of Classification Search
CPC ........ B60L 15/20; B60L 7/18; B60L 2240/12; B60L 2240/423; B60L 2250/26; B60L 2260/24; B60L 2260/26; B60L 7/10; B60L 15/2009; B60W 50/029; B60W 2050/0292; B60W 2710/083; B60W 2520/10; B60W 2540/10; B60W 30/18072; B60W 30/18127; Y02T 10/72
See application file for complete search history.

(56) References Cited

U.S. PATENT DOCUMENTS

| | | | |
|---|---|---|---|
| 10,821,948 B2 | 11/2020 | Fridman et al. | |
| 2002/0193935 A1 | 12/2002 | Hashimoto et al. | |
| 2013/0146374 A1* | 6/2013 | Books | B60L 50/15 180/65.21 |
| 2015/0266383 A1* | 9/2015 | Kidston | B60L 58/12 701/70 |

(Continued)

FOREIGN PATENT DOCUMENTS

| | | | |
|---|---|---|---|
| CN | 206287853 U | * | 6/2017 |
| CN | 110877535 A | | 3/2020 |
| DE | 102009030816 A1 | | 11/2010 |

OTHER PUBLICATIONS

Machine translation of CN-206287853-U obtained from Espacenet.
Lin et al. Inefficacy self-diagnosis and self preservation protect footboard device. Jun. 30, 2017. (Year: 2017).*

(Continued)

*Primary Examiner* — Khoi H Tran
*Assistant Examiner* — Tien Minh Le
(74) *Attorney, Agent, or Firm* — Brooks Kushman PC

(57) ABSTRACT

A method of controlling a vehicle. The vehicle includes an axle assembly and a one-pedal driving system. The axle assembly may be operatively connected to an electrical machine that is configured to provide torque to a vehicle wheel. The one-pedal driving system that has a pedal that controls torque provided by the electrical machine.

20 Claims, 6 Drawing Sheets

(56) References Cited

U.S. PATENT DOCUMENTS

| | | | | |
|---|---|---|---|---|
| 2016/0375794 A1* | 12/2016 | Nishida | ............... | B60L 15/20 |
| | | | | 701/22 |
| 2018/0093572 A1* | 4/2018 | Hall | ............... | B60T 8/245 |
| 2021/0122387 A1* | 4/2021 | Hoop | ............... | B60W 10/184 |
| 2022/0258616 A1* | 8/2022 | Hanchett | ............... | H04L 12/12 |

OTHER PUBLICATIONS

Extended European Search Report dated Sep. 25, 2023 for related European Appln. No. 23154017.0; 27 Pages.
Partial European Search Report dated Jul. 6, 2023 for related European Appln. No. 23154017.0; 29 Pages.

* cited by examiner

US 12,090,860 B2

METHOD OF CONTROLLING A VEHICLE HAVING A ONE-PEDAL DRIVING SYSTEM

TECHNICAL FIELD

The invention relates to one or more methods of controlling a vehicle having a one-pedal driving system.

BACKGROUND

A vehicle having a regenerative brake system adapted to effect a regenerative braking command is disclosed in U.S. Pat. No. 10,821,948.

SUMMARY

In at least one embodiment a method of controlling a vehicle is provided. The method may include providing an axle assembly and a one-pedal driving system. The axle assembly is operatively connected to an electrical machine that is configured to provide torque to a vehicle wheel. The one-pedal driving system has a pedal that controls torque provided by the electrical machine. An operating region may be determined based on vehicle speed and a position of the pedal. Torque that is provided to the electrical machine may be controlled based on the operating region.

In at least one embodiment a method of controlling a vehicle is provided. The method may include providing an axle assembly and a one-pedal driving system. The axle assembly is operatively connected to an electrical machine that is configured to provide torque to a vehicle wheel. The one-pedal driving system has a pedal, a first pedal sensor, and a second pedal sensor. The pedal controls torque provided by the electrical machine. The first pedal sensor provides a first signal indicative of a position of the pedal. The second pedal sensor provides a second signal that is also indicative of the position of the pedal. The method may include determining whether the first signal is sufficiently close to the second signal. Operation of the electrical machine may be controlled based on whether the first signal is sufficiently close to the second signal.

In at least one embodiment a method of controlling a vehicle is provided. The method may include providing an axle assembly and a one-pedal driving system. The axle assembly is operatively connected to an electrical machine that is configured to provide torque to a vehicle wheel. The one-pedal driving system has a pedal that controls torque provided by the electrical machine. The method may determine whether deceleration is requested based on a signal indicative of a position of the pedal. A regenerative braking command may be determined based on the signal and a regeneration factor when deceleration is requested. Regenerative brake torque may be provided with the electrical machine based on the regenerative braking command.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
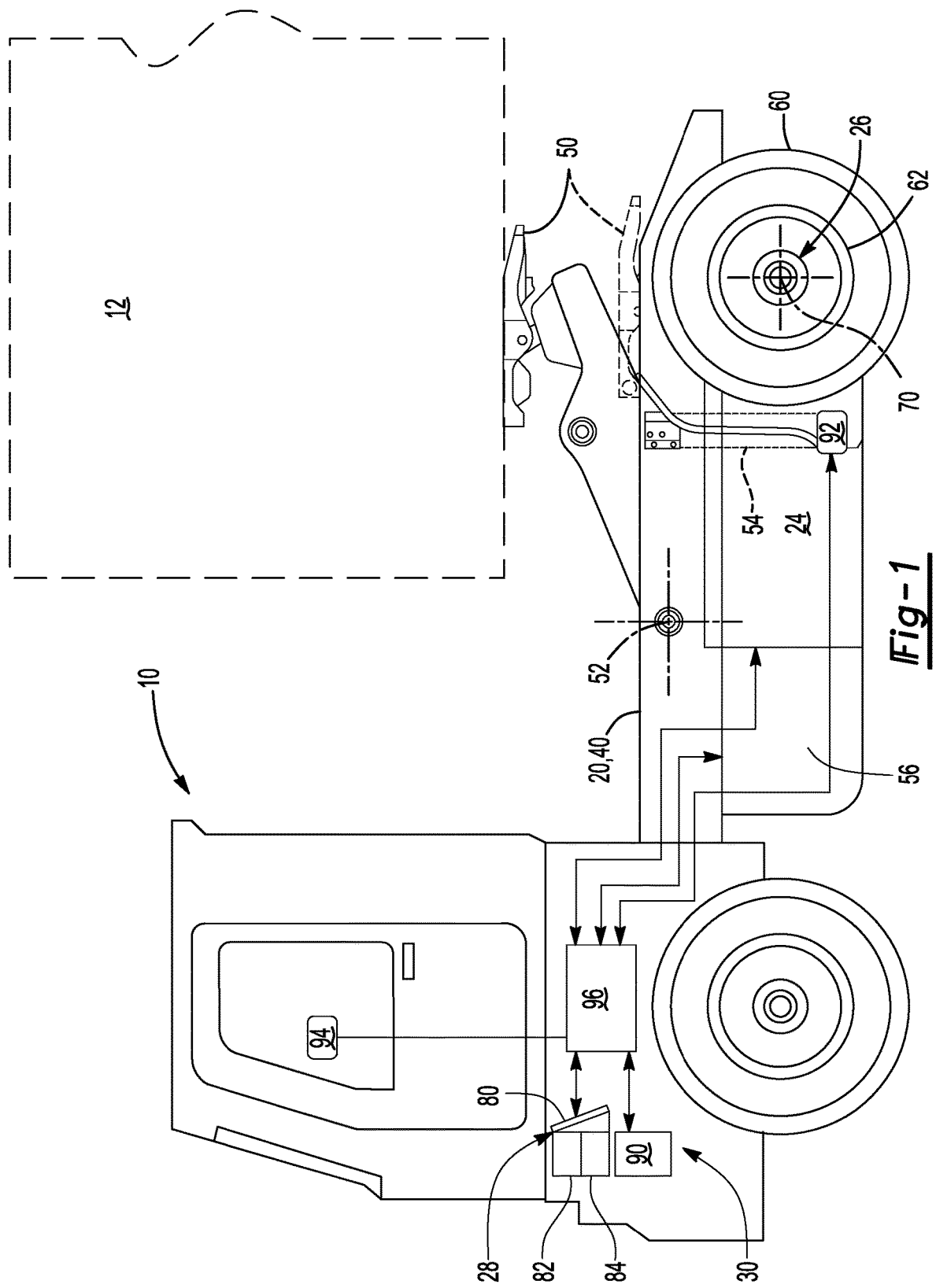
FIG. 1 is a side view of an example of a vehicle.
Figure 2:
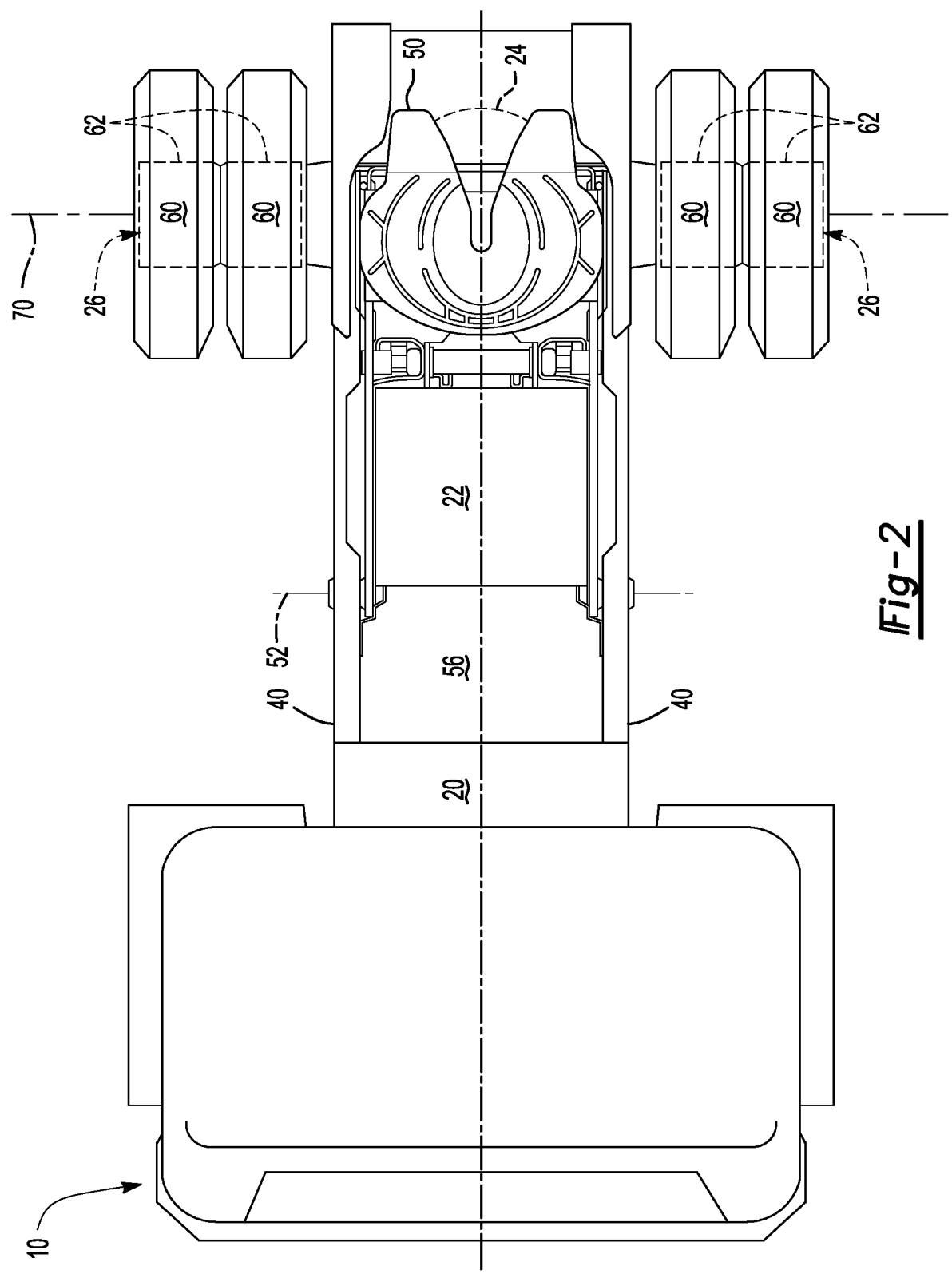
FIG. 2 is a top view of the vehicle shown in FIG. 1.

Referring to FIGS. 1 and 2, an example of a vehicle 10 is shown. The vehicle 10 may be of any suitable type. For instance, the vehicle 10 may be a land vehicle like a truck, bus, farm equipment, mining equipment, military transport or weaponry vehicle, or cargo loading equipment for land, air, or marine vessels. In the configuration shown, the vehicle 10 is depicted as a tractor to which a trailer 12 for transporting cargo may be attached. The tractor may be configured to move a trailer along a road or may be a terminal tractor that may move a trailer at a warehouse facility, intermodal freight facility, or cargo yard. The vehicle 10 may be configured as an electric vehicle or hybrid electric vehicle. In at least one configuration, the vehicle 10 may include a chassis 20, at least one torque source 22, an axle assembly 24, at least one wheel end assembly 26, a one-pedal driving system 28, and a control system 30.

The chassis 20 may be the frame or support structure of the vehicle 10. In at least one configuration, the chassis 20 may include a pair of frame rails 40. The frame rails 40 may be spaced apart from each other and may extend generally parallel to each other in a longitudinal direction. The frame rails 40 may be interconnected by one or more cross members. In at least one configuration, a fifth wheel coupling 50 may be movably disposed on the chassis 20.

The fifth wheel coupling 50 may allow a trailer 12 to be pivotally coupled to the vehicle 10 in a manner known by those skilled in the art. The fifth wheel coupling 50 may be pivotable about a fifth wheel coupling axis 52 to raise and lower the fifth wheel coupling 50 with respect to the chassis 20. In FIG. 1, the fifth wheel coupling 50 is shown in a raised position with solid lines and is shown in a lowered position with phantom lines. The fifth wheel coupling 50 may be coupled to the trailer 12 when in the raised position and may be detached from a trailer 12 when in the lowered position.

Referring to FIG. 1, one or more actuators 54 such as hydraulic cylinders may be provided to pivot the fifth wheel coupling 50 about the fifth wheel coupling axis 52. The actuator 54 may be mounted to the chassis 20 and may be extended to raise the fifth wheel coupling 50 and retracted to lower the fifth wheel coupling 50.

Referring to FIG. 2, one or more torque sources 22 may be provided with the vehicle 10. A torque source 22 may have any suitable configuration. For instance, a torque source 22 may be an electrical machine such as an electric motor in a vehicle having an electric or hybrid electric configuration. A torque source 22 may be an internal combustion engine, such as in a vehicle having a hybrid electric configuration. A torque source 22 that is configured as an electrical machine may be electrically connected to a power source 56, such as a battery, capacitor, fuel cell, or combinations thereof.

A torque source 22 that is configured as an electrical machine may provide propulsion torque or regenerative braking torque. Propulsion torque may be used to propel the vehicle 10, such as in a forward or backward direction. Propulsion torque may also be used to hold the vehicle in a stationary position or to help reduce or limit vehicle rollback, such as on an inclined surface. Regenerative braking may provide a regenerative braking torque, which may also be referred to as regenerative brake torque. Regenerative braking may capture kinetic energy when the electrical machine is used to brake or slow the velocity of the vehicle 10. Recovered energy may be transmitted along the drivetrain from the vehicle traction wheels to drive the electrical machine. Thus, the electrical machine may function as a generator and may be used to charge an electrical power source.

The axle assembly 24 may operatively connect the torque source 22 to one or more traction wheel assemblies that may include a tire 60 mounted on a wheel 62. The axle assembly 24 may be mounted to the chassis 20. In the configuration shown in FIG. 2, the axle assembly 24 or a portion thereof may be positioned underneath the fifth wheel coupling 50. One or more axle assemblies 24 may be provided with the vehicle 10. For instance, a multi-axle or tandem axle configuration may be provided in which axle assemblies are connected in series. The torque source 22 may be mounted to the axle assembly 24 or may be remotely positioned from the axle assembly 24.

The axle assembly 24 may have any suitable configuration. As an example, the axle assembly may have a housing assembly that may be mounted to the chassis 20. The housing assembly may receive a differential assembly that may be operatively connected to axle shafts and may permit the axle shafts to rotate at different rotational speeds in a manner known by those skilled in the art. The axle shafts may operatively connect the differential assembly to the vehicle traction wheels. A drive pinion may be received in the housing assembly and may transmit torque between the differential assembly and a transmission module. The transmission module may provide gear reduction and may transmit torque between the drive pinion and the torque source 22. The transmission module may be received in the housing assembly.

One or more wheel end assemblies 26 may be associated with the axle assembly 24. A wheel end assembly 26 may be operatively connected to an axle shaft and may support a wheel 62. For instance, a wheel end assembly 26 may have a wheel hub to which the wheel 62 may be mounted. The wheel hub may be rotatable about a wheel axis 70 and may be operatively connected to a corresponding axle shaft. The wheel hub may be rotatably disposed on a supporting component, such as the housing assembly of the axle assembly, a knuckle, a support structure that extends from the chassis 20, or the like.

Referring to FIG. 1, the one-pedal driving system 28 may provide the ability to make the vehicle 10 stop and go using only a single input device. For instance, the one-pedal driving system 28 may allow a driver to bring the vehicle 10 to a full stop without using a brake pedal that may control operation of a friction brake, such as a disc brake or drum brake. In at least one configuration, the one-pedal driving system 28 may include a pedal 80, a first pedal sensor 82, and a second pedal sensor 84.

The pedal 80 may be an input device that is operated by the driver to request acceleration and deceleration of the vehicle 10. The pedal 80 may have any suitable configuration. For instance, the pedal 80 may be a foot-operated pedal that may be mounted near the floor of the passenger compartment of the vehicle 10 or may be a hand-operated pedal that may be provided in another location, such as proximate a steering wheel or control console of the vehicle 10.

The pedal 80 may be moveable between a first position and a second position. The first position may be a released position in which pedal 80 is not actuated or depressed by the driver. The first position may correspond with a 0% pedal position when expressed as a percentage, such as in FIG. 4. The second position may be a fully actuated or "full throttle" position in which the pedal 80 is actuated or depressed by the driver to its fullest extent. The second position may correspond with a 100% pedal position when expressed as a percentage. The pedal may also be actuated to multiple intermediate positions between the first position and the second position. The se intermediate positions may correspond to pedal positions that are greater than 0% and less than 100% when expressed as a percentage.

The first pedal sensor 82 may provide a signal that is indicative of the position of the pedal 80. For instance, the first pedal sensor 82 may detect the position of the pedal 80 and may provide a signal indicative of the position of the pedal 80. The signal may be processed to express the pedal position as a percentage. For clarity in reference, the signal associated with the first pedal sensor 82 may be referred to as a first signal.

The second pedal sensor 84, if provided, may also provide a signal that is indicative of the position of the pedal 80. A such, the second pedal sensor 84 may provide the same function as the first pedal sensor 82 and may provide redundancy that may be used to evaluate whether the first pedal sensor 82, the second pedal sensor 84, or both are functioning properly. For clarity in reference, the signal associated with the second pedal sensor 84 may be referred to as a second signal.

The control system 30 may monitor and control various components and systems of the vehicle 10. For example, the control system 30 may include one or more microprocessor-based control modules or controllers 96 that may be electrically connected to or communicate with components of the vehicle 10, such as the torque source 22, axle assembly 24, the one-pedal driving system 28, the actuator 54 for the fifth wheel coupling 50, and the power source 56 to monitor and control their operation and performance. In addition, the control system 30 may also process input signals or data from various input devices or sensors. These input devices may include a vehicle speed sensor 90, a retardation sensor 92, a communication device 94, or combinations thereof.

The vehicle speed sensor 90 may be provided to detect the speed of the vehicle 10. The vehicle speed sensor 90 may be of any suitable type as is known by those skilled in the art. The vehicle speed sensor 90 may be disposed in any suitable location. For example, the vehicle speed sensor 90 may detect rotation of a wheel hub, axle shaft, drive pinion, or other rotatable component downstream from the transmission module.

The retardation sensor 92 may provide a signal indicative of a retardation force exerted on the vehicle 10, excluding retardation force exerted by regenerative braking and the friction brakes. The retardation sensor 92 may be of any suitable type. For instance, the retardation sensor 92 may be associated with a power source 56 or may be associated with vehicle load A retardation sensor 92 associated with a power source 56 may include an engine brake, exhaust brake, hydraulic driveline retarder, electric driveline retarder, or the like. A retardation sensor 92 associated with vehicle load may be a load sensor that may be associated with one or more axle assemblies, the fifth wheel coupling 50, or both. For instance, a load sensor may be provided with one or more axle assemblies 24 of the vehicle 10 or its trailer 12 to provide a signal or data indicative of the vehicle weight. Similarly, a sensor associated with fifth wheel coupling 50, such as a sensor associated with the hydraulic pressure associated with the actuator 54 may provide a signal or data indicative of the weight of the vehicle 10.

The communication device 94 may be provided to receive an input from the driver and optionally to provide information to the driver. The communication device 94 may be of any suitable type or types, such as a switch, button, sensor, display, touchscreen, or the like. The communication device 94 may be used to input data that may not be predetermined or provided by a sensor, such as may be the case when a vehicle 10 is not equipped with one or more of the sensors previously discussed. For example, the communication device 94 may facilitate entry of information regarding vehicle weight. The communication device 94 may allow the driver to enable or disable a method of control, manually adjust the responsiveness of regenerative braking, or both.

Figure 3:
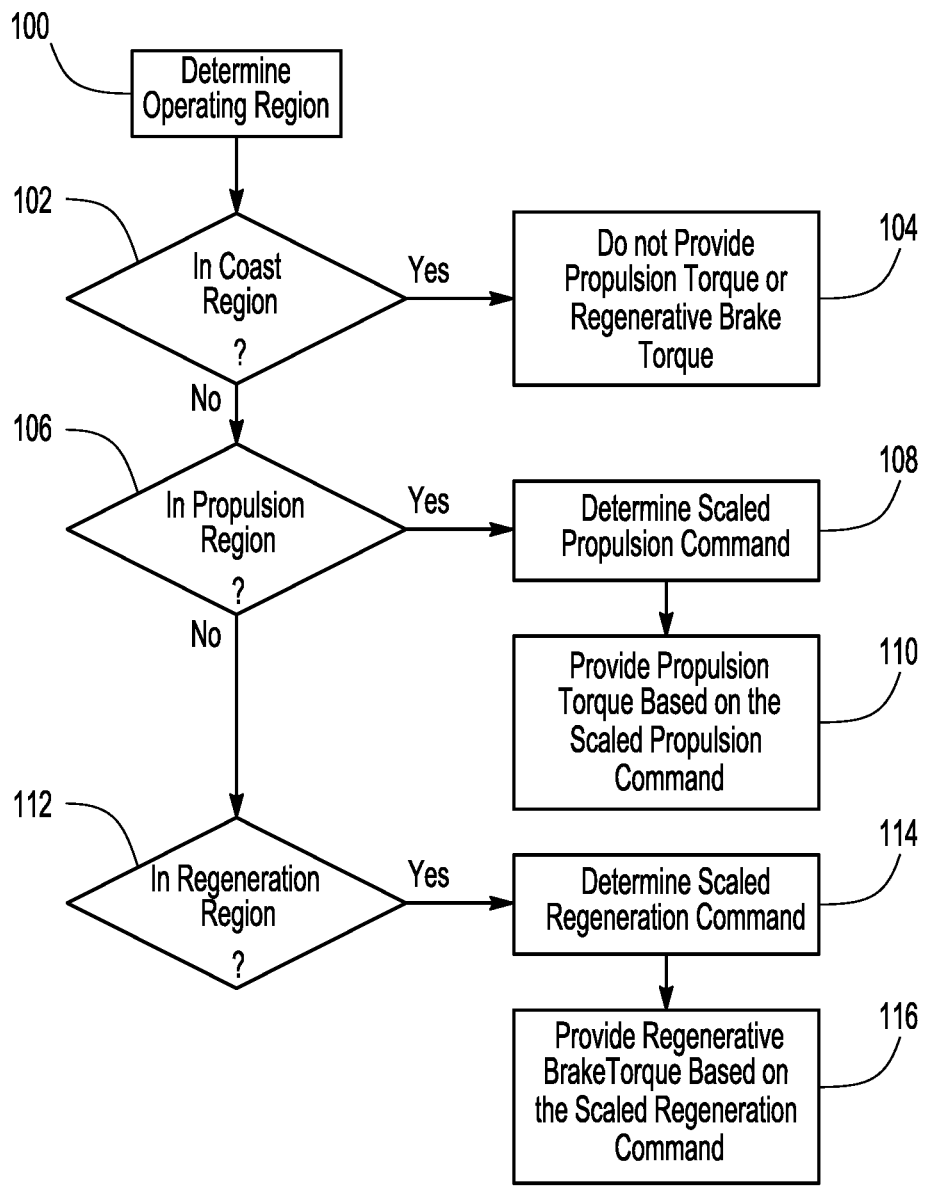
FIG. 3 is a flowchart of a method of control.
Figure 6:
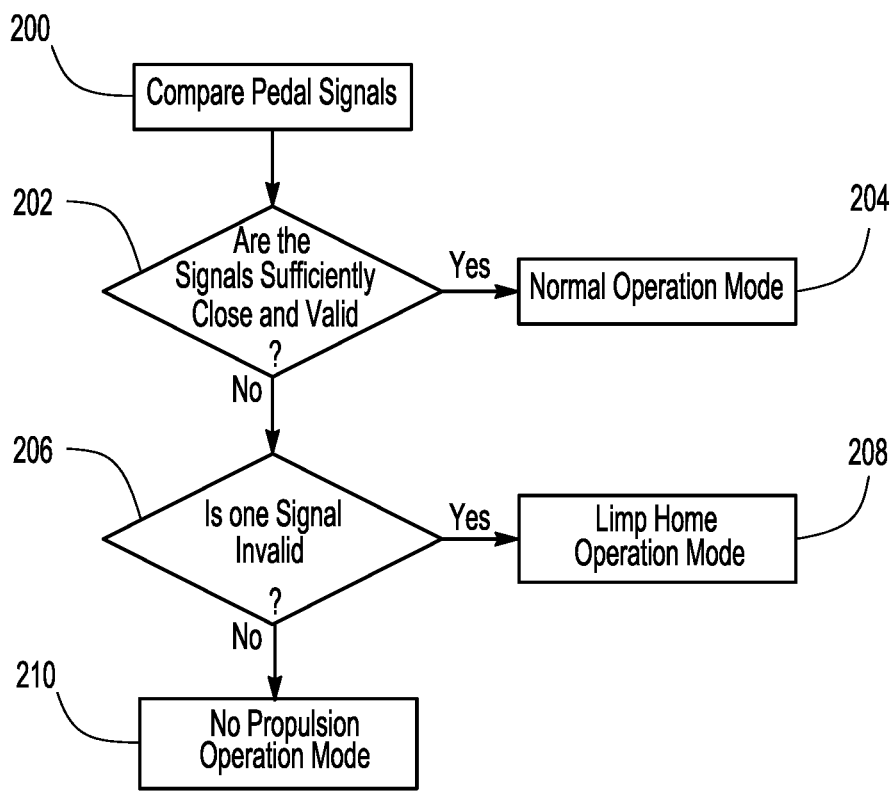
FIG. 6 is a flowchart of a method of control based on a comparison of signals associated with a pedal.
Figure 7:
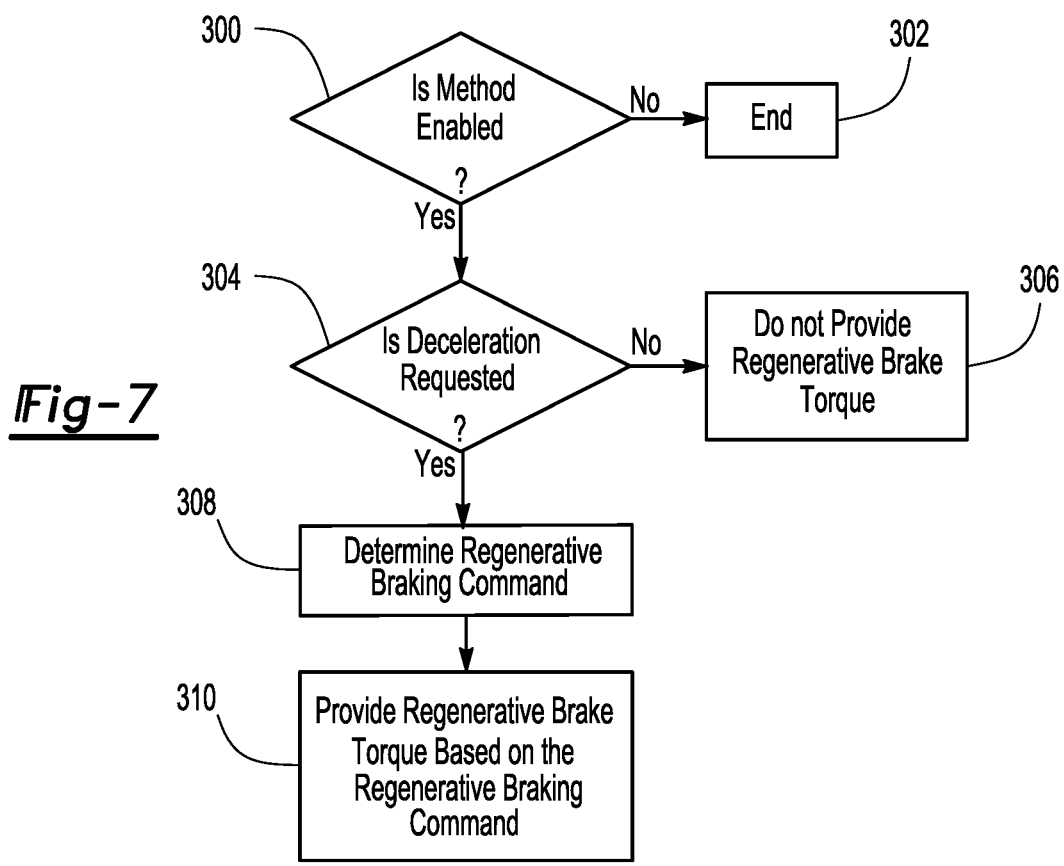
FIG. 7 is a flowchart of a method of control associated with regenerative braking.

Referring to FIGS. 3, 6, and 7, flowcharts of exemplary methods of controlling a vehicle are shown. As will be appreciated by one of ordinary skill in the art, the flowcharts may represent control logic which may be implemented or affected in hardware, software, or a combination of hardware and software. For example, the various functions may be affected by a programmed microprocessor. The control logic may be implemented using any of a number of known programming and processing techniques or strategies and is not limited to the order or sequence illustrated. For instance, interrupt or event-driven processing may be employed in real-time control applications rather than a purely sequential strategy as illustrated. Likewise, parallel processing, multitasking, or multi-threaded systems and methods may be used.

Control logic may be independent of the particular programming language, operating system, processor, or circuitry used to develop and/or implement the control logic illustrated. Likewise, depending upon the particular programming language and processing strategy, various functions may be performed in the sequence illustrated, at substantially the same time, or in a different sequence while accomplishing the method of control. The illustrated functions may be modified, or in some cases omitted, without departing from the scope of the present invention. Method steps may be executed by the control system 30 and may be implemented as a closed loop control system.

A vehicle may be controlled using one or more of the methods shown in FIGS. 3, 6, and 7. The methods in FIGS. 3, 6, and 7 may be configured to control a vehicle 10 or axle assembly that is associated with a one-pedal driving system 28. As an overview, in a vehicle having a one-pedal driving system 28 and an electric or hybrid electric vehicle configuration, the power source 56 may provide power to the electrical machine and the electrical machine may provide propulsion torque to the vehicle traction wheels when propulsion torque is requested, such as to accelerate the vehicle 10. The electrical machine may act as a generator and convert kinetic energy from the vehicle's motion into electricity and provide torque that slows rotation of the wheels 62 when regenerative braking torque is requested.

A driver may move the pedal 80 toward the second position to request propulsion torque and release the pedal 80 to request regenerative brake torque to decelerate the vehicle 10. For instance, the driver may ease off the pedal 80 or permit the pedal 80 to move toward the first position when the driver anticipates a stop ahead. In response, the vehicle 10 may be permitted to coast (e.g., propulsion torque and regenerative brake torque may not be provided by the electrical machine) when the magnitude of pedal rotation is sufficiently small or may regenerative brake force may be applied to actively decelerate the vehicle 10 when the pedal 80 is more aggressively released. Fully releasing the pedal 80 may permit regenerative brake torque to be provided by the electrical machine until the vehicle 10 comes to a stop. Once the vehicle 10 stops, the friction brakes may be engaged to hold the vehicle 10 in a stationary position until the driver presses the pedal 80 to request propulsion.

Referring to FIG. 3, a method of control is shown that attenuates the acceleration and deceleration requested by the driver to improve drivability. As an overview, the pedal can be used to request vehicle acceleration, maintain speed, or request vehicle deceleration in a vehicle having a one-pedal driving system as discussed above. However, controlling acceleration and deceleration in direct proportion to the pedal position can result in a jerky response and or abrupt acceleration/deceleration changes. Moreover, providing regeneration torque at the operating capability of the electrical machine may be overresponsive at low and high vehicle speeds. Such overresponsiveness may feel to the driver like the friction brakes are being applied and thus the pedal responsiveness may feel different to the driver at different vehicle speeds, which may make the vehicle more difficult to drive, may reduce driver comfort, or both. The method addresses these problems by associating the pedal position with one of three operating regions. Torque that is provided by the electrical machine may be controlled based on the operating region and the speed of the vehicle.

Figure 4:
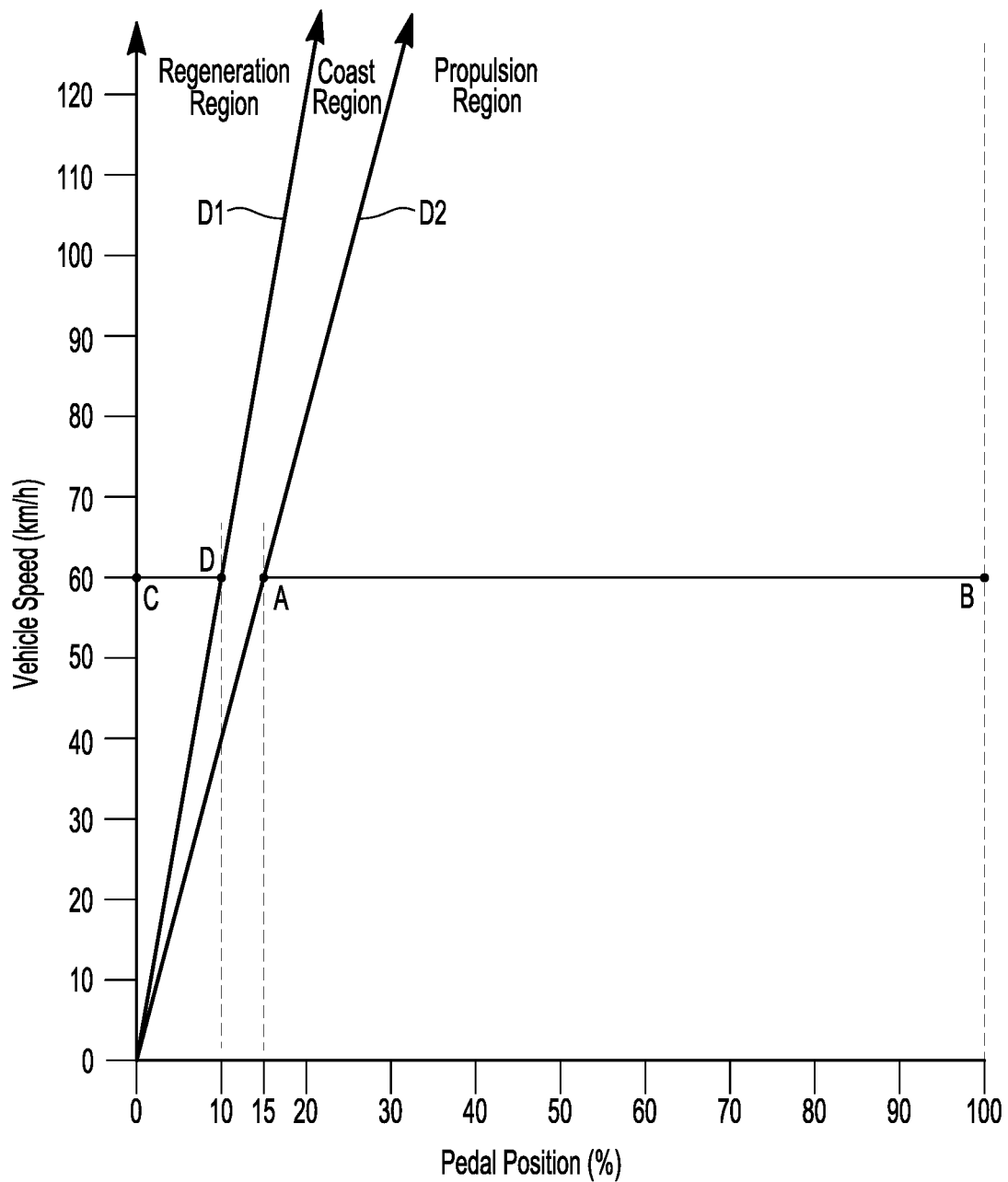
FIG. 4 is a plot showing examples of coast, motoring, and regeneration regions associated with the method of FIG. 3.
Figure 5:
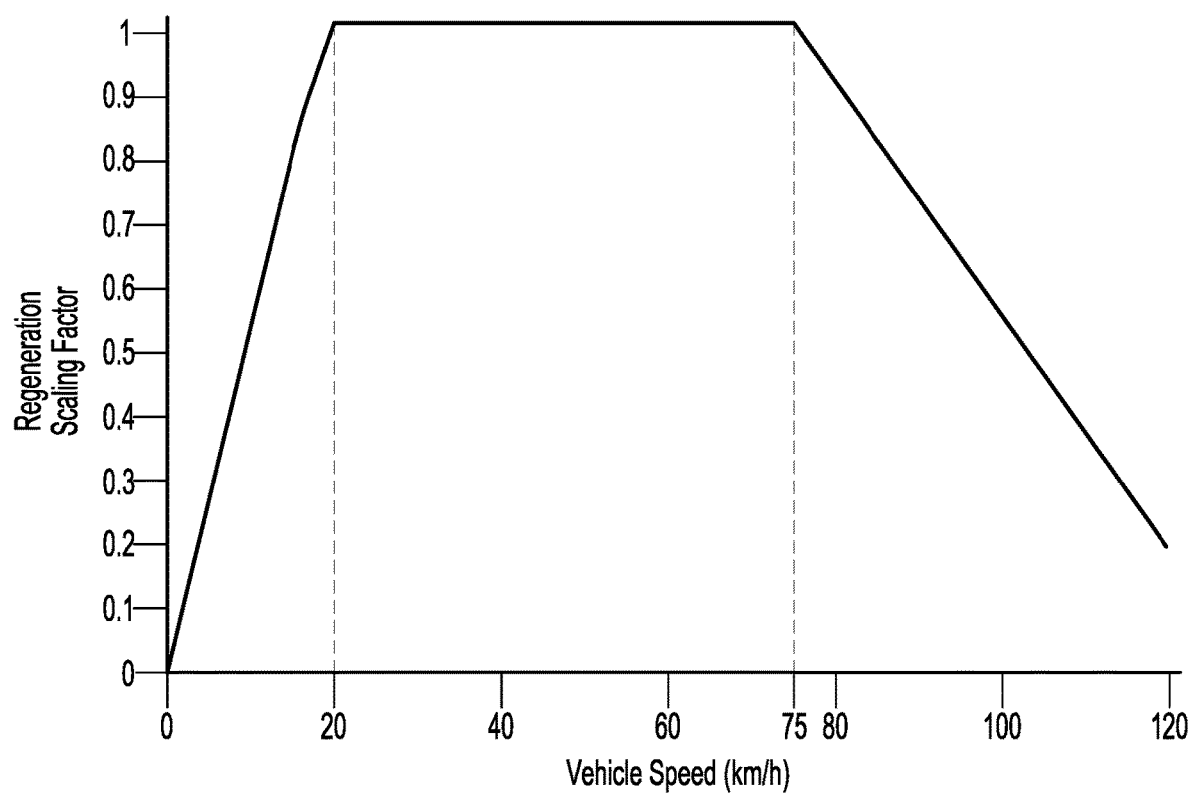
FIG. 5 is a plot showing examples of regeneration scaling factors that can be employed with the method of FIG. 3.

The method shown in FIG. 3 is best understood with reference to FIGS. 4 and 5.

FIG. 4 illustrate examples of different operating regions. Operating regions are illustrated with the pedal position expressed as a percentage along the horizontal axis and vehicle speed plotted along the vertical axis.

The coast region is bounded by a first line D1 and a second line D2 that may extend from the intersection of the horizontal and vertical axes. The first line D1 and the second line D2 are illustrated as being straight lines; however, it is contemplated that the first line D1 or a portion thereof may be nonlinear and/or that the second line D2 or a portion thereof may be nonlinear. The first line D1 and the second line D2 become further apart as vehicle speed increases. In addition, the first line D1 and the second line D2 extend further to the right as vehicle speed increases.

The propulsion region is located to the right of the coast region. As such, the propulsion region is located to the right of the second line D2 and is partially bounded by the second line D2. In addition, the propulsion region may be separated from the regeneration region by the coast region.

The regeneration region is located to the left of the coast region. As such, the regeneration region is located to the left of the first line D1 in his partially bounded by the first line D1.

Referring to FIG. 3, the method will now be discussed.

At block 110, an operating region may be determined. The operating region may be determined based on vehicle speed and the position of the pedal 80. Vehicle speed may be based on a signal from the vehicle speed sensor 90. The position of the pedal 80 may be based on a signal from the first pedal sensor 82, the second pedal sensor 84, or both. The operating region in which the vehicle is operating may be the coast region, the propulsion region, or the regeneration region as previously discussed. These regions will be described sequentially below; however, the method may determine an operating region in a different manner or different sequence than that shown in FIG. 3.

At block 102, the method may determine whether the operating region is the coast region. The vehicle may be operating in the coast region when the vehicle speed and pedal position correspond with the coast region. For instance, in the example shown in FIG. 4 the vehicle is operating in the coast region at a vehicle speed of 60 km/h and when the pedal position is from 10 to 15%. A lookup table may be used to determine the operating region (e.g., vehicle speed and pedal position may be used to lookup the operating region in a lookup table). If the operating region is the coast region, then the method may continue at block 104. If the operating region is not the coast region, then the method may continue at block 106.

At block 104, the electrical machine may be controlled such that the vehicle is allowed to coast. Accordingly, propulsion torque and regenerative brake torque may not be provided with the electrical machine when the vehicle is operating in the coast region.

At block 106, the method may determine whether the operating region is the propulsion region. The vehicle may be operating in the propulsion region when the vehicle speed and pedal position correspond with the propulsion region. For instance, in the example shown in FIG. 4 the vehicle is operating in the propulsion region at a speed of 60 km/h and when the pedal position is greater than 15%. A lookup table may be used to determine whether the vehicle is operating in the propulsion region. If the operating region is the propulsion region, then the method may continue at block 108. If the operating region is not the propulsion region, then the method may continue at block 112.

At block 108, a scaled propulsion command may be determined when the vehicle is operating in the propulsion region. The scaled propulsion command may be determined by scaling the detected position of the pedal with respect to a propulsion torque vector that is based on vehicle speed and that extends from the coast region to a maximum position of the pedal. An example of this is best understood with reference to FIG. 4.

In FIG. 4, the width of the propulsion region decreases as the vehicle speed increases. This is due to the configuration of the coast region and the second line D2. A propulsion torque vector is the available propulsion range or width of the propulsion region at a given speed. As such, a propulsion torque vector extends from the coast region to the maximum position of the pedal when expressed as a percentage. At a given vehicle speed, the associated propulsion torque vector extends from one endpoint to another. Examples of such endpoints at a vehicle speed of 60 km/h are designated point A to point B. Point A corresponds with an endpoint of the vector that intersects the coast region. Point B corresponds with the opposite endpoint of the vector at a maximum pedal position (i.e., 100%). The detected position of the pedal is scaled based on the propulsion torque vector associated with the current vehicle speed and may be expressed as follows:

Scaled $Cmd_{Propulsion} = 100/(\text{Vector } B_i - \text{Vector } A_i) * \text{Pedal Position}$ where:

Scaled $Cmd_{Propulsion}$ is the scaled propulsion command,

Vector $A_i$ is the first endpoint of the propulsion torque vector at the coast region at vehicle speed i, expressed as a percentage, Vector $B_i$ is the second endpoint of the propulsion torque vector at vehicle speed i, expressed as a percentage (i.e., 100%), and Pedal Position is the position of the pedal, expressed as a percentage.

Thus, when the vehicle speed 60 km/h, Vector $A_{60}$ is 15% and Vector $B_{60}$ is 100%. If the pedal is moved to 40% then Pedal Position is 40% and the scaled propulsion command is 47.06%.

$100/(100-15)*40=47.06$

At block 110, propulsion torque may be provided based on the scaled propulsion command. In the example above, the propulsion torque may be provided based on the scaled propulsion command of 47.06% rather than the detected pedal position of 40%. Therefore, the electrical machine may be operated to provide propulsion torque rather than regenerative brake torque and the amount of propulsion torque provided with the electrical machine to a vehicle wheel may correspond with or may be based on the scaled propulsion command.

At block 112, method may determine whether the operating region is the regeneration region. This block may be omitted in the flowchart in FIG. 3 since a determination has already been made that the vehicle is not operating in the coast region or the propulsion region. However, this block may be kept if operating regions were assessed in a different order. For instance, in the example shown in FIG. 4 the vehicle is operating in the regeneration region at a speed of 60 km/h when the pedal position is less than 10%. A lookup table may be used to determine whether the vehicle is operating in the regeneration region. The method may continue at block 114.

At block 114, a scaled regeneration command may be determined when the vehicle is operating in the regeneration region. The scaled regeneration command may be determined by scaling the position of the pedal with respect to a regenerative brake torque vector that is based on vehicle speed and that extends from the coast region to a minimum position of the pedal. An example of this is best understood with reference to FIG. 4.

In FIG. 4, the width of the regeneration region increases as the vehicle speed increases. This is due to the configuration of the coast region and the first line D1. A regenerative brake torque vector is the available regeneration range or width of the regeneration region at a given speed. As such, a regenerative brake torque vector extends from the coast region to the minimum position of the pedal when expressed as a percentage. At a given vehicle speed, the associated regenerative brake torque vector extends from point D to point C. Point D corresponds with an endpoint of the vector that intersects the coast region. Point C corresponds with the opposite endpoint of the vector at a minimum pedal position (i.e., 0%). The detected position of the pedal is scaled based on the regenerative brake torque vector associated with the current vehicle speed and may be expressed as follows.

Scaled $Cmd_{Regeneration\ I} = 100/(\text{Vector } D_i - \text{Vector } C_i) * \text{Pedal Position}$ where:

Scaled $Cmd_{Regeneration\ I}$ is the scaled regeneration command,

Vector $D_i$ is the first endpoint of the regenerative brake torque vector at the coast region at vehicle speed i, expressed as a percentage, Vector $C_i$ is the second endpoint of the regenerative brake torque vector at vehicle speed i, expressed as a percentage (i.e., =0%), and Pedal Position is the position of the pedal, expressed as a percentage.

Thus, when the vehicle speed 60 km/h, Vector $C_{60}$ is 0% and Vector $D_{60}$ is 10%. If the pedal is moved to 5% then Pedal Position is 5% and the scaled propulsion command is 50%.

$$100/(10-0)*5=50$$

Determining the scaled regeneration command may also include modifying the scaled regeneration command by a regeneration scaling factor. This is best understood with reference to FIG. 5.

FIG. 5 shows examples of regeneration scaling factors at different vehicle speeds. The regeneration scaling factor is a number between 0 and 1. Regeneration scaling factors may be stored in a lookup table or may be calculated. In FIG. 5, the regeneration scaling factor is less than 1 at vehicle speeds less than 20 km/h, 1 at vehicle speeds from 20-75 km/h, and less than one at vehicle speeds greater than 75 km/h. The regeneration scaling factors associated with vehicle speeds less than 20 km/h may decrease as the vehicle speed decreases. The regeneration scaling factors associated with vehicle speeds greater than 75 km/h may decrease as the vehicle speed increases.

The scaled regeneration command may be multiplied by a corresponding regeneration scaling factor and may further adjust the regeneration braking torque that is provided. This is shown in the following expression:

$$\text{Scaled Cmd}_{Regeneration\ J} = \text{Scaled Cmd}_{Regeneration\ I} * RSF_i$$

where:

Scaled $\text{Cmd}_{Regeneration\ J}$ is the resultant scaled regeneration command after applying the regeneration scaling factor, Scaled $\text{Cmd}_{Regeneration\ I}$ is the scaled regeneration command before applying the regeneration scaling factor, and $RSF_i$ is the regeneration scaling factor at vehicle speed i.

Using the example discussed above, at a vehicle speed of 60 km/h the regeneration scaling factor is 1 as shown in FIG. 5. Therefore, regenerative braking torque is not further clipped or reduced at 60 km/h (or at vehicle speeds from 20-75 km/h) since multiplying the scaled regeneration command by 1 does not change the scaled regeneration command. As such, the scaled regeneration command may not be modified by a regeneration scaling factor when the vehicle speed is greater than or equal to the first speed value (20 km/h in FIG. 5) and less than or equal to the second speed value (75 km/h in FIG. 5).

The scaled regeneration command may be modified by a regeneration scaling factor when the vehicle speed is less than a first speed value (20 km/h in FIG. 5). For instance, at a vehicle speed of 80 km/h, the regeneration scaling factor is 0.9. Thus, the resultant scaled regeneration command at this speed when the pedal position is moved to 10% pedal position (i.e., Scaled $\text{Cmd}_{Regeneration\ J}$=100/(12.5-0)* 10=80) is multiplied by the regeneration scaling factor of 0.9, resulting in a resultant scaled regeneration command of 72% (80%*0.9=72%). Regeneration scaling factors are used to reduce the regeneration torque at low vehicle speeds to reduce the regenerative braking torque so that the vehicle does not slow down too quickly or in a manner that is perceived to be discomforting or too aggressive by the driver.

The scaled regeneration command may also be modified by a regeneration scaling factor when the vehicle speed is greater than a second speed value (75 km/h in FIG. 5) that is greater than the first speed value. Thus, regeneration scaling factors may affect resultant scaled regeneration command at speeds above 75 km/h using the scaling factor examples shown in FIG. 5. Regenerative scaling factors are used to reduce the regeneration torque at high vehicle speeds to reduce the regenerative braking torque so that the vehicle does not slow down in a manner that is perceived to be too aggressive by the driver or that results in deceleration that feel similar to applying the friction brakes.

At block 116, regenerative brake torque may be provided based on the resultant scaled regeneration command. Therefore, the electrical machine may be operated to provide regenerative brake torque rather than propulsion torque and the amount of regenerative brake torque provided with the electrical machine to a vehicle wheel to slow rotation of the wheel may correspond with or may be based on the resultant scaled regeneration command.

Referring to FIG. 6, a method of control is shown that may assess signals indicative of the position of the pedal and execute an operation mode in response. More specifically, the method of control in FIG. 6 evaluates whether reliable or trustable pedal position data is available and limits the propulsion torque if the pedal position data is deemed unreliable. The method in FIG. 6 may be employed independently or in conjunction with the method shown in FIG. 3.

At block 200, the method may compare signals from multiple sensors that are indicative of the position of the pedal 80. For instance, the first signal provided by the first pedal sensor 82 may be compared to the second signal provided by the second pedal sensor 84. Since the first pedal sensor 82 and the second pedal sensor 84 both provide signals that are indicative of the position of the same pedal 80, it is normally expected that the first signal will be sufficiently similar or sufficiently close to the second signal. For instance, it is normally expected that the pedal position detected by the first pedal sensor 82 and the pedal position detected by the second pedal sensor 84 will be the same or will be within an error range or design tolerance of the sensors.

At block 202, the method may determine whether the signals are sufficiently close and valid.

The first signal may be sufficiently close to the second signal when the first signal is the same as the second signal or when the first signal and the second signal overlap after the error range of the sensors is taken into account. For example, if the first signal is indicative of a 50% pedal position, the second signal is indicative of a 51% pedal position, and the range of error of each sensor is ±1%, then the signals overlap (and are considered sufficiently close) since the pedal position detected by the first pedal sensor after accounting for the range of error is 49% to 51% while the pedal position detected by the second pedal sensor after accounting for the range of error is 50% to 52%.

A sensor signal may be valid when a signal is received from a sensor (e.g., the sensor is functioning and there is signal communication), the signal is sufficiently stable (e.g., the signal is not erratic), the signal is indicative of a pedal position change or rate of change that is within the operating range of the sensor, the rate of change indicated by the signal is not faster than the pedal can be actuated or is expected to be actuated, the signal is within the expected output range of the sensor or design attributes of the sensor, or combinations thereof.

If the first signal is sufficiently close to the second signal, then the method may continue at block 204. If the first signal is not sufficiently close to the second signal, the method may continue at block 206.

At block 204 a normal operation mode may be executed. The first signal and the second signal are both sufficiently close and valid and thus deemed sufficiently reliable or trustable. Propulsion and regeneration torque may be provided in response to the pedal position as actuated by the driver in the normal operation mode.

At block 206, the method may determine whether one of the signals from the sensors is invalid. A sensor signal may be invalid when it is not valid, such as when a signal is not received from a sensor, a signal is received but is not sufficiently stable (e.g., the signal is erratic), the signal is indicative of a pedal position change or rate of change that is not within the operating range of the sensor, the rate of change indicated by the signal is faster than the pedal can be actuated or is expected to be actuated, the signal is not within the expected output range of the sensor or design attributes of the sensor, or combinations thereof. If some but not all of the signals are valid (e.g., one signal is valid while the other signal is invalid), then the method may continue at block 208. If multiple signals are invalid, then the method may continue at block 210.

At block 208, a limp home operation mode may be executed. Propulsion and regeneration torque may be provided in response to the valid signal or from the sensor that is operating normally. However, the method may limit the propulsion torque provided by the electrical machine. For instance, the propulsion torque may be limited by a predetermined amount or capped so that the propulsion torque cannot exceed a predetermined amount. For instance, the propulsion torque may be limited to 15% of the maximum or rated output torque of the electrical machine. As such, the method may permit propulsion of the vehicle but may limit the acceleration that may be provided by the electrical machine, may limit the overall vehicle speed, or both to help ensure safe operation of the vehicle. Additionally, a warning may be provided to the driver that is indicative of a potential sensor malfunction. The warning may be provided in any suitable manner, such as via the communication device 94.

At block 210, a no propulsion mode may be executed. Propulsion torque may not be provided by the electrical machine to propel the vehicle in the no propulsion operation mode. As such, the propulsion torque provided by the electrical machine may be limited to zero even when the driver depresses the pedal 80.

Referring to FIG. 7, a method of control is shown that modifies deceleration requested by the driver to improve drivability. The method in FIG. 7 may be employed independently or in conjunction with the method shown in FIG. 3 and independently or in conjunction with the method shown in FIG. 6. The method in FIG. 7 may be well-suited for vehicles that can accommodate heavy loads, such as loads that can exceed four times the weight of the vehicle when unloaded.

At block 300, an assessment may be made as to whether the method is enabled. The method may be enabled automatically or may be selectively enabled or disabled by the driver, such as by using the communication device 94. If the method is not enabled, then the method or method iteration may end at block 302. If the method is enabled, then the method may continue at block 304.

At block 304, the method may determine whether deceleration of the vehicle is requested. A request for deceleration may be based on one or more signals indicative of the position of the pedal 80. For instance, a deceleration request may be based on a change in the position of the pedal 80. Deceleration may be requested when the pedal 80 is released or permitted to move toward the first position. Deceleration may not be requested when the position of the pedal 80 does not change (e.g., no speed change requested) or when the position of the pedal 80 is further depressed (e.g., acceleration is requested). If deceleration is not requested, then the method may continue at block 306. If deceleration is requested, then the method may continue at block 308.

At block 306, regenerative brake torque may not be provided by the electrical machine. Regenerative brake torque may not be provided because the pedal position is not indicative of a request for deceleration and thus is not indicative of a request to slow the vehicle. As a result, there may be no need to provide regenerative brake torque to slow the vehicle.

At block 308, a regenerative braking command may be determined. The regenerative braking command may be based on the amount of deceleration requested and a regeneration factor. The amount of deceleration that is requested may be based on the change in position of the pedal 80 and thus may be based on one or more signals indicative of the position of the pedal 80. The regeneration factor may be based on a retardation force exerted on the vehicle and may be provided by the retardation sensor 92. The regeneration factor may increase as the retardation force increases. For instance, when the regeneration factor is based on vehicle load the regeneration factor may increase as the vehicle load increases. As an example, the regeneration factor may be a number between 0 and 3. Regeneration factors may be stored in a lookup table and may be associated with a corresponding retardation force. For instance, the regeneration factor may be 0.2 when the vehicle is unloaded, may be 1.1 at a vehicle load of 5000 pounds (2268 kg), and may be 1.4 at a vehicle load of 7500 pounds (3402 kg).

As an example, a change in the pedal position from 50% to 25% is indicative of a request for deceleration. The pedal position of 25% may then be multiplied by the regeneration factor. Using the regeneration factors in the previous paragraph, when the vehicle is unloaded the regenerative braking command result is 5% (25%*0.2=5.0%). At 5000 pounds, the result is 27.5% (25%*1.1=27.5%). At 7500 pounds, the result is 35% (25%*1.1=35.0%).

At block 310, regenerative brake torque may be provided with the electrical machine based on the regenerative braking command. The regenerative braking command may be used to apply a corresponding percentage of the available regenerative brake torque available to slow the vehicle. Thus, the regenerative brake torque may increase as the retardation force or vehicle load increases for a given deceleration request. Providing regenerative brake torque in this manner may help the vehicle maintain traction and may improve driver comfort by providing less regeneration torque to decelerate the vehicle at lower vehicle loads and thus deceleration may feel smoother and less jarring to the driver.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of controlling a vehicle comprising:
providing an axle assembly that is operatively connected to an electrical machine that is configured to provide torque to a vehicle wheel and a one-pedal driving system that has a pedal that controls torque provided by the electrical machine;
determining an operating region based on vehicle speed and a position of the pedal; and
controlling torque that is provided by the electrical machine based on the operating region, wherein controlling torque that is provided by the electrical machine includes determining a scaled propulsion command when the vehicle is operating in a propulsion region and providing propulsion torque to the vehicle wheel with the electrical machine based on the scaled propulsion command, and wherein the scaled propulsion command is determined by scaling a detected position of the pedal with respect to a propulsion torque vector that is based on the vehicle speed and that extends from a coast region to a maximum position of the pedal.

2. The method of claim 1 wherein determining the operating region includes determining whether the vehicle is operating in the coast region, the propulsion region, or a regeneration region based on vehicle speed and the position of the pedal.

3. The method of claim 2 wherein controlling torque that is provided by the electrical machine includes not providing propulsion torque or regenerative brake torque with the electrical machine when the vehicle is operating in the coast region.

4. The method of claim 2 wherein controlling torque that is provided by the electrical machine includes determining a scaled regeneration command when the vehicle is operating in the regeneration region and providing regenerative brake torque to the vehicle wheel with the electrical machine based on the scaled regeneration command.

5. The method of claim 1 wherein the propulsion torque vector is a width of the propulsion region at a given speed.

6. The method of claim 1 wherein the position of the pedal and the scaled propulsion command are expressed as a percentage.

7. The method of claim 1 wherein the detected position of the pedal is scaled based on the propulsion torque vector associated with the vehicle speed and is expressed as follows:

$$\text{Scaled } Cmd_{Propulsion} = 100/(\text{Vector } B_i - \text{Vector } A_i) * \text{Pedal Position}$$

wherein: Scaled $Cmd_{Propulsion}$ is the scaled propulsion command, Vector $A_i$ is a first endpoint of the propulsion torque vector at the coast region at vehicle speed i, expressed as a percentage, Vector $B_i$ is a second endpoint of the propulsion torque vector at vehicle speed i, expressed as a percentage, and Pedal Position is the detected position of the pedal, expressed as a percentage.

8. A method of controlling a vehicle comprising:
providing an axle assembly that is operatively connected to an electrical machine that is configured to provide torque to a vehicle wheel and a one-pedal driving system that has a pedal that controls torque provided by the electrical machine;
determining an operating region based on vehicle speed and a position of the pedal; and
controlling torque that is provided by the electrical machine based on the operating region, wherein controlling torque that is provided by the electrical machine includes determining a scaled regeneration command when the vehicle is operating in a regeneration region and providing regenerative brake torque to the vehicle wheel with the electrical machine based on the scaled regeneration command, wherein the scaled regeneration command is determined by scaling a detected position of the pedal with respect to a regenerative brake torque vector that is based on the vehicle speed and that extends from a coast region to a minimum position of the pedal.

9. The method of claim 8 wherein the scaled regeneration command is modified by a regeneration scaling factor when the vehicle speed is less than a first speed value.

10. The method of claim 9 wherein the scaled regeneration command is modified by the regeneration scaling factor when the vehicle speed is greater than a second speed value that is greater than the first speed value.

11. The method of claim 10 wherein the scaled regeneration command is not modified by the regeneration scaling factor when the vehicle speed is greater than the first speed value and less than the second speed value.

12. The method of claim 8 wherein the regenerative brake torque vector is a width of the regeneration region at a given speed.

13. The method of claim 8 wherein the detected position of the pedal is scaled based on the regenerative brake torque vector associated with the vehicle speed and is expressed as follows:

$$\text{Scaled } Cmd_{Regeneration\ I} = 100/(\text{Vector } D_i - \text{Vector } C_i) * \text{Pedal Position}$$

wherein: Scaled $Cmd_{Regeneration\ I}$ is the scaled regeneration command, Vector $D_i$ is a first endpoint of the regenerative brake torque vector at the coast region at vehicle speed i, expressed as a percentage, Vector $C_i$ is a second endpoint of the regenerative brake torque vector at vehicle speed i, expressed as a percentage, and Pedal Position is the detected position of the pedal, expressed as a percentage.

14. A method of controlling a vehicle comprising:
providing an axle assembly that is operatively connected to an electrical machine that is configured to provide torque to a vehicle wheel and a one-pedal driving system that has a pedal that controls torque provided by the electrical machine, a first pedal sensor that provides a first signal indicative of a position of the pedal, and a second pedal sensor that provides a second signal indicative of the position of the pedal;
determining whether the first signal is sufficiently close to the second signal; and
controlling operation of the electrical machine based on whether the first signal is sufficiently close to the second signal, wherein a limp home operation mode is executed when the first signal is not sufficiently close to the second signal and the first signal or the second signal is invalid, and wherein executing the limp home operation mode includes operating the electrical machine based on the one of the first signal or the second signal that is not invalid and limiting propulsion torque that is provided by the electrical machine.

15. The method of claim 14 wherein a normal operation mode is executed when the first signal is sufficiently close to the second signal.

16. The method of claim 14 wherein a no propulsion mode is executed when the first signal is not sufficiently close to the second signal and the first signal and second signal are both invalid, wherein executing the no propulsion mode includes not providing propulsion torque with the electrical machine.

17. The method of claim 14 wherein executing the limp home operation mode includes not operating the electrical machine based on the first signal when the first signal is invalid and not operating the electrical machine based on the second signal when the second signal is invalid.

18. The method of claim 14 wherein executing the limp home operation mode includes determining which one of the first signal and the second signal is not invalid and operating the electrical machine based on the one of the first signal or the second signal that is not invalid but not based on the one of the first signal and the second signal that is invalid.

19. The method of claim 14 wherein the first signal is invalid when the first signal is not received from the first pedal sensor.

20. The method of claim 14 wherein the first signal is invalid when the first signal is indicative of a pedal position rate of change that is not within an operating range of the first pedal sensor.

* * * * *